United States Patent [19]
Yanagida et al.

[11] Patent Number: 5,633,466
[45] Date of Patent: May 27, 1997

[54] MAXIMUM VALUE STORAGE SENSOR

[75] Inventors: Hiroaki Yanagida, 3-19, Sasu-machi 1-chome, Chofu-shi, Tokyo; Junichi Yoshiike, Nagano-ken; Masato Ichikawa, Nagano-ken; Hirokazu Nakasone, Nagano-ken; Yohichi Kobayashi, Nagano-ken; Reizi Saitoh, Nagano-ken, all of Japan

[73] Assignees: Hiroaki Yanagida; Nagano Keiki Seisakusho, Ltd., both of Tokyo, Japan

[21] Appl. No.: 622,473

[22] Filed: Mar. 25, 1996

[30] Foreign Application Priority Data

Sep. 29, 1995 [JP] Japan .................. 7-252907
Sep. 29, 1995 [JP] Japan .................. 7-252908

[51] Int. Cl.⁶ ............................................. G01B 7/16
[52] U.S. Cl. ............................................. 73/774; 73/770
[58] Field of Search ........................... 73/769, 770, 772, 73/773, 774, 781, 830, 834, 855

[56] References Cited

U.S. PATENT DOCUMENTS

| | | | |
|---|---|---|---|
| 3,779,071 | 12/1973 | Thamas, Jr. et al. | 73/767 |
| 4,065,962 | 1/1978 | Shoberg | 73/862.628 |
| 5,095,756 | 3/1992 | Edwards | 73/774 |

FOREIGN PATENT DOCUMENTS

| | | | |
|---|---|---|---|
| 6331581 | 12/1994 | Japan | G01N 27/00 |
| 7128156 | 5/1995 | Japan | G01L 1/20 |

Primary Examiner—Richard Chilcot
Assistant Examiner—Max H. Noori
Attorney, Agent, or Firm—Michael D. Bednarek; Kilpatrick & Cody L.L.P.

[57] ABSTRACT

The object of the present invention is to provide a maximum value storage sensor when detecting the maximum strain by generating an invariable electrical resistance change correlative to the strain of the detection object in a conductive body having a plurality of conductive elements. The maximum value storage sensor of the present invention has; a conductive body having a circuit which gives correlative resistance changes corresponding to the sequential cutoff of a plurality of conductive elements each having a given electrical resistance arrayed in parallel; a cutting means for cutting the conductive elements of the conductive body; and a structure for allowing one of the conductive bodies and the cutting means to move relatively to each other. The sensor is attached to an object component member in a structure so as to generate relative movements between the conductive body and the cutting means which correspond to any strains exerted upon the object component member, and it detects maximum strains in the object component member by allowing the cutting means to sequentially cut off the conductive elements of the conductive body corresponding to an amount of the relative movement.

14 Claims, 11 Drawing Sheets

1

MAXIMUM VALUE STORAGE SENSOR

TECHNICAL FIELD

The present invention relates to a maximum value storage sensor for detecting maximum strains or maximum displacements corresponding to a maximum load experienced by a structural or membranous members of ground structures such as buildings, bridges, or membrane structures; or non-ground structures such as aircraft, or vessels. The sensor of this invention is capable of non-destructive detection of strength changes caused by aging loads exerted on by external forces, such as earthquakes, to the component members, whose data facilitates, for instance, predictive diagnosis for the possibility of fracture in structures.

BACKGROUND ART

The maximum value storage sensor are disclosed in Laid-open Japanese Patent Application under publication Nos. Hei 6-331581 and Hei 7-128156. The sensors have a structure formed by connecting a plurality of conductive elements such as carbon filaments having an appropriate resistance are connected in parallel to a pair of terminals at slightly different degree of slackness, and also attached to the object component member to be detected of a structure so that a stress is induced to each of the conductive elements by a strain or displacement of the object component member. When a stress is induced, corresponding to the degree, the conductive elements, each having a different degree of slackness, break sequentially in increasing order of degree of slackness, and a resultant change in the electrical resistance is detected as the electrical resistance changes across the terminals, or as the voltage change depending on the resistance changes. The resistance across the terminals indicates that the broken conductive elements can be determined from the resistance, which gives the maximum value of strain or displacement of the component member.

These maximum value storage sensors can be universally used with various types of structures and have many advantages including a considerably high detection accuracy and a simple construction. However, since these sensors use the basic principle that the maximum strain will be detected through the sequential self-breakage of conductive elements, each which has a slightly different degree of slackness caused by the strain of the object component member, the sensors have a disadvantage in that a stable detection accuracy can not necessarily be satisfactorily maintained. In other words, the key factor of a stable detection accuracy in these maximum value storage sensors is setting the desired degrees of slackness for each of the conductive elements; furthermore, the detection accuracy is also subject to the difference of tensile strength of the conductive elements. Setting the conductive elements to a minutely different degrees of slackness for each conductive element is very difficult, and if a sequential breakage of the conductive elements does not occur as expected, there is a possibility that conductive elements will not necessarily break in the sequentially predetermined order; and keeping a uniform tensile strength of the conductive elements is also rather difficult which leads to an inability of sufficiently securing a stable detection accuracy.

The present invention has been made in consideration of these circumstances and one of its objects is to provide a more stable and higher detection accuracy to the maximum value storage sensor when detecting the maximum strain by generating an invariable electrical resistance change correlative to the strain of the detection object in a conductive body having a plurality of conductive elements as mentioned above.

Another object of the present invention is to provide structures for enhancing the serviceability relative to the above-mentioned maximum value storage sensor.

A further object of the present Invention is to provide an output circuit for processing sensor information from the above-mentioned maximum value storage sensor into information which can be processed by an electronic circuit.

DISCLOSURE OF THE INVENTION

The maximum value storage sensor of the present invention has; a conductive body having a circuit which gives correlative resistance changes corresponding to the sequential cutoff of a plurality of conductive elements each having a given electrical resistance arrayed in parallel; and a cutting means for cutting the conductive elements of the conductive body, and one of the conductive bodies and the cutting means is allowed to move relatively to each other. The sensor is attached to an object component member in a structure so as to generate relative movements between the conductive body and the cutting means which correspond to any strains exerted upon the object component member, and it detects maximum strains in the object component member by allowing the cutting means to sequentially cut off the conductive elements of the conductive body corresponding to an amount of the relative movement.

One of the preferred basic forms for this maximum value storage sensor is typically shown in FIG. 18 (the first basic form, hereafter). A conductive body 100 in FIG. 18 is formed by a plurality of conductive elements 101, 101, - - -, formed of filaments such as carbon filaments, being arrayed in parallel and connected between a pair of terminals 102, 102, and folded parts 103 formed by folding back the middle part of the conductive elements are arranged so as to form a transverse line. On the other hand, a cutting means 106 is formed such that, when there is movement relative to the conductive body along the direction of the arrow X, a cutter 105 cuts off a pressed conductive element by sequentially pressing the conductive elements corresponding to the relative movement at the folded part forming the transverse line.

Another preferred basic form (the second basic form, hereafter) is typically shown in FIG. 19. A conductive body 110 in FIG. 19 is formed so that filamentary conductive elements 112, 112, - - -, are formed on a sheet board 111, arranged in parallel with a predetermined space, and the conductive elements are connected at terminals 113, 113 formed on the same board 111. Each of the conductive elements are sequentially cut off on the board or together with the board from one end toward the other by moving the cutting means 114 along the direction of the arrow Y relatively to the conductive body, or by moving the conductive body 110 relatively to the cutting means 114.

The detection accuracy of the above-mentioned maximum value storage sensor according to the present invention depends mainly on the accuracy of the conductive elements array and the accuracy of the cutting means. As understood from the foregoing basic forms, it is easy to provide the conductive elements with the necessary array with a high accuracy, and there is not any difficulty with accuracy in forming the cutting means.

In the case of the first basic form, the array of the conductive elements needs only to be arranged transversally in one line at the bending part of each conductive element; it is easy to achieve a high accuracy with the array. With this basic form in particular, even if there are any irregularities in transverse arrangement at the bending part, the influence by the irregularities will become half because the conductive elements are folded back, thus leading to higher accuracy. The uniformity in length of each conductive element is not necessarily needed, but uniformity is preferred; and therefore, making each of the length of the conductive elements uniformity will further facilitate the work. Forming the cutter part in a step-formed structure suffices for the cutting means; there is not any particular difficulty with the machining accuracy.

In the case of the second basic form, the conductive elements needs only to be arranged in parallel with a predetermined space; utilizing the printed circuit board technology or the like will facilitate high-accuracy work. A cutting structure as a widely used cutter suffices for the cutting means; any difficulty with accuracy does not exist.

In addition to the above-mentioned accuracy factor, the accuracy of the relative movement between the conductive body and the cutting means will influence the detection accuracy of the maximum value storage sensor according to the present invention; however, the structure for permitting this relative movement between the conductive body and the cutting means need only a movable support for the moving elements; and for this, there is no difficulty with accuracy. In the case of the first basic form, the accuracy of the relative movement between the conductive body and the cutting means will be improved by adding a sliding structure that moves the cutting means relative to the conductive body, being housed in a watertight protective case, and the protective case supports the sliding movement of the slider.

As described above, in the maximum value storage sensor according to the present invention, the stable detection accuracy will be given by elements each of facilitating a high-accuracy working; and therefore, a high and stable detection accuracy will be achieved.

The foregoing maximum value storage sensors, especially the maximum value storage sensor with the first basic form can be formed in a structure that a plurality of the conductive bodies are overlapped so as to arrange each of the conductive elements with a certain space at the folding parts in the direction of the relative movement against the cutting means. This structure permits a larger number of filaments of conductive elements to be housed in a smaller space; and therefore, the sensor will detect a larger strain and raise the resolution, and a wider detection range and a higher resolution can be realized in a rather small space.

In the maximum value storage sensor according to the first basic form, applying carbon filaments to the conductive elements will permit a higher accuracy detection. In the maximum value storage sensor according to the first basic form, pressing the cutter part of the cutting means onto the bending part as mentioned above cuts off the conductive elements; this cutoff is caused mainly by "bending breakage". Therefore, applying carbon filaments having a character being not easy to be elongated due to a high tensile strength but easy to be ruptured by bending breakage will sensitively produce a cutoff by bending breakage, and enhance the detection accuracy.

Furthermore, in the maximum value storage sensors of the first basic form and the foregoing second basic form, particularly the maximum value storage sensor of the second basic form, besides forming the conductive elements using a material with an appropriate resistance, it will be possible to form a cutoff objective part using a good conductor such as copper or aluminum and to constitute a conductive element having a necessary resistance as a whole by connecting a resistance element additionally. This constitution is also effective when carbon filaments are applied to the conductive elements. This is because a bunch of carbon filaments has a comparably high resistance, for instance, several thousand ohms, if the bunch has a few number of the filaments, but to make easy handling in production or the like, increasing the number of the filaments will decrease the resistance. Thus, increasing the number of filaments only with carbon filaments will lead to not giving a resistance necessary for an effective detection to each conductive element. Therefore, connecting a resistance element to a bunch of carbon filaments will produce a conductive element having a desirable resistance and easy handling.

Furthermore, in the maximum value storage sensors of the first and second basic form, it is convenient in performing a precise initial setting to install a conductive element for an initial setting and cut off the conductive element by the cutting means so as to constitute an initial positioning relation between the cutting means and the conductive body.

Furthermore, in the maximum value storage sensors of the first and second basic form, it is possible to form a conductive element for a check not subject to a cutoff by the cutting means and to check the disconnection of an output circuit by using the conductive element for a check, which will further enhance the reliability.

The present invention proposes a more concrete structure, relating to the maximum value storage sensor according to the foregoing first basic form, particularly to a slider for moving the cutting means relatively to the conductive body, being housed in a watertight protective case, and having a structure to support its sliding movement by the protective case. The slider according to the proposition comprises a slider block, a rod of a slender bar projecting out of the slider block, and a connecting part formed at the end of the rod. At one end of the protective case, a through hole part communicating with the outside is formed, through which the front end of the rod projects out of the protective case.

This structure will increase the water tightness of the protective case, and enhance the serviceability under a severe condition exposed by wind and rain or the like. In the maximum value storage sensor having a structure as described above, the slider has to move in and out of the protective case; therefore, a communicating part is needed to be attached to the protective case, which allows the slider to move in and out of the case. This part will be the biggest weak point in securing the water tightness of the protective case. However as described above, the slider has the rod of a slender bar; it is possible to make the rod in a round bar or square bar so as to pass through the communicating part in the protective case, and to apply a ring seal fitting in the circumferential shape of the rod part; and therefore, it becomes easier to secure the water tightness around the communicating part and becomes possible to secure the water tightness of the protective case at a level for a practical use.

The present invention proposes a structure for the slider movement as to the foregoing maximum value storage sensor. Concretely, a rail is formed in the protective case, the slider movement trajectory is made to be restricted by the rail. The rail in the protective case will be molded in a convex form, or concave form provided that the protective case is made of aluminum casting or the like. To impose the restriction of the movement trajectory on the slider, it is necessary to form a correlating part fitting in the rail on the slider and to have the correlating part fit in the rail part.

Thus, to make the structure as above, it is possible to remove the factors to give bad influences on the detection accuracy, the looseness, inclination or the like, generated with the slider movement; consequently, it will improve the response characteristic for the cutoff of the conductive elements to the strain or displacement of the object component member, leading to enhancing detection accuracy.

The present invention proposes a structure for the cutting means as to the foregoing maximum value storage sensor. The cutting means is comprised of a comb part having a plurality of comb teeth and cutters formed at each of inner ends of the gaps between the comb teeth, and cuts the conductive elements by the cutters with having each of the conductive elements on the conductive body inserted into each of the gaps between the comb teeth. In addition to this, each of the comb teeth is tapered toward the front end.

The cutting means of this structure secures the isolation of each of the conductive elements and the accuracy of sequentially cutting off the conductive elements, by putting in each of the conductive elements into each of the gaps between the comb teeth. To exert these functions, it is necessary to put in each of the conductive elements into each of the gaps between the comb teeth in the assembly. However, since the comb teeth are made thinner toward the front end, that is, the comb teeth are tapered in their full or partial length, the work becomes easier which puts in the conductive elements into the gaps between the comb teeth, therefore the cause is substantially eliminated which gives damages to the conductive elements in performing this work. The tapered structure of the comb teeth functions as easily guiding the conductive elements to the cutoff positions; consequently, it improves the assemblibility being a major factor in the serviceability, and stabilizes the cutoff position, enhancing the performance.

As for the structure of the comb part, further improvement can be made by arranging each end of the comb teeth along a slantly crossed line against the longitudinal direction of the comb teeth. Thus, each of the comb teeth are arranged in a stepped form, that is, each of the lengths of the gaps between the comb teeth becomes sequentially short; it is possible to put in each of the conductive elements one by one into each of the gaps between the comb teeth sequentially from the longer gap. Consequently, compared with the case of putting in all of the conductive elements simultaneously into each of the gaps, the work becomes easier, and the cause will further reduces which gives damages to the conductive elements.

Furthermore, the present invention proposes a structure for the conductive body as to the foregoing maximum value storage sensor. The conductive body for the first proposition is formed in such a manner that a given number of the conductive elements are sandwiched between a pair of sheet materials each having an opening part, being laminated so as to overlap both of the openings, and a folded part is made to appear in the opening part with having the conductive elements arrayed transversally in one line.

The conductive body according to the first proposition has the sheet materials continuously connected; therefore, in handling the conductive body, this structure will effectively prevent a load such as a tensile force causing the cutoffs or damages of the conductive elements from imposing on them. Thus, in assembling or replacing the conductive body, the structure will substantially eliminate the factors to induce defects in the conductive body.

The conductive body according to the second proposition is formed such that a given number of the conductive elements is sandwiched between a pair of sheet materials formed of non-thermoplastic resin and laminated by an adhesive agent of thermoplastic resin, on the Junction surface of which electrode terminals from the conductive elements are formed for output.

According to the second proposition, since both of the sheet materials are joined by using a thermoplastic resin as an adhesive under a pressurized and heating condition, the electrode terminals of both the sheet materials and the conductive elements can be brought into contact with each other with a large contact pressure; decreasing the contact resistance between the electrode terminals and the conductive elements to a low level and stabilizing the contact resistance at this low level. The adhesive bonding by pressurization and heating will effectively prevent the adhesive from penetrating into the contact part between the electrode terminals and the conductive elements, and it will raise the stability of the electrical contact between the electrode terminals and the conductive elements. Consequently, it will stabilize the contact resistance between the electrode terminals and the conductive elements at a low level, enhancing the detection accuracy.

The adhesive bonding by pressurization and heating as in the second proposition is also effective for preventing the adhesive from penetrating into the gaps of each of carbon filaments when widely preferred carbon filaments are used for the conductive elements, which also contributes to obtaining a high detection accuracy. When carbon filaments are used, one conductive element is formed with some ten to several hundred carbon filaments bound into a bunch, and the adhesive bonding by pressurization and heating will effectively prevent the adhesive from penetrating into the gaps of each of carbon filaments and varying the resistance of the conductive elements, enhancing the detection accuracy.

Furthermore, according to the second proposition, electrode terminals formed at each of the pair of sheet materials come into contact with the conductive elements from both sides, which will also reduce the contact resistance between the conductive elements and the electrode terminals. When carbon filaments are used for the conductive elements, one conductive element is formed with some ten to several hundred carbon filaments bound into a bunch; in this case, a part of the carbon filaments is subject to indirectly coming into contact with the electrode terminals through the other carbon filaments. Therefore as in the second proposition, bringing the electrode terminals into contact with the conductive elements from both sides will decrease the number of the carbon filaments indirectly coming into contact with the electrode terminals, which will further reduce the contact resistance between the conductive elements and the electrode terminals.

Relating to the conductive body formed as in the foregoing propositions, in incorporating the conductive body into the protective case forming a recess in the retaining sheet, forming a projection in the protective case, and hooking the recess in the retaining sheet on the projection in the protective case will position the conductive body inside the protective case. Thus, the positioning of the conductive body in the protective case will be done easily and precisely, which will improve the assemblibility being an important factor in serviceability and the performance stability.

Furthermore, the present invention proposes a structure for the protective case as to the foregoing maximum value storage sensor. The protective case is formed of a metallic material to have an electromagnetic interference preventive function. To form the protective case of this type with a high precision and a reduced weight, aluminum is used to form the protective case by casting.

The maximum value storage sensor as described above needs a sensor information relating to the inherent characteristic of itself, when it feeds an end output for a value equivalent a strain or displacement in the component member of the detection object. An example of this sensor information is a range information. The range information is necessary, because the sensor has a detectable range relative to a strain or displacement in the object component member. The range is given by the relation between the strain or displacement in the object component member and the sequential cutoff of the conductive elements created with the strain or displacement; in other words, the relation between the unit strain or unit displacement and the cutoff number of the conductive elements. And, when using a plurality of the maximum value storage sensors simultaneously, and collectively processing the outputs from these sensors, an information for recognizing each of these maximum value storage sensors becomes a necessary sensor information. These sensor information are desirably given in a form of directly processible data by the electronic circuit.

To give these sensor information in a form of processible data by an electronic circuit, the output circuit in the foregoing maximum value storage sensor according to the present invention is so configured that the output circuit can feed the sensor data of the maximum value storage sensor based on an identifying resistance connected to the output voltage path A of a pair of output voltage path A and B in the parallel resistance circuit formed by the conductive elements on the conductive body.

According to this output circuit, the electronic circuit processing for an end output will obtain a sensor data by reading out the value of the identifying resistance integrated into the output circuit, or the voltage value depending on the resistance value. Since the sensor data can be processed in an electronic circuit, the circuit for processing an end output is capable of feeding out a value equivalent to the strain or displacement of the object component member or the like, by processing both the output relative to the cutoff state of the conductive elements and the sensor data output from the maximum value storage sensor.

It is preferable, in the output circuit of this type, to feed the sensor data as the voltage $E_1$ between the output voltage path C and the output voltage path A in this state, branching the third output voltage path C from the output voltage path A connected to the identifying resistance and applying the same constant current to the output voltage path A, B, C; and to feed the cutoff state of the conductive elements as the voltage E, obtaining the voltage E between the output voltage path C and the output voltage path B by $E=E_2-E_1$ from the voltage $E_1$ and voltage $E_2$ between the output voltage path A and B.

Thus, it is possible to remove the influence of the identifying resistance to the voltage E representing the output relative to the cutoff state of the conductive elements, and to reduce the processing load of the circuit for processing an end output. The circuit structure of this type is capable of removing the influence of the compensation resistance from the output circuit, to compensate a resistance variation due to the temperature variation of the conductive elements, in incorporating a compensation resistance producing a resistance variation corresponding to the resistance variation due to the temperature variation of the conductive elements into either one of a pair of the output voltage paths, by incorporating a balance resistance having the similar characteristic to the compensation resistance into the third output voltage path; furthermore as an additional advantage, it is possible to remove the influence of an intrinsic resistance of the lead wire guided out of the maximum value storage sensor from the output voltage of an output circuit.

BEST MODE FOR THE CARRYING THE INVENTION

Figure 1:
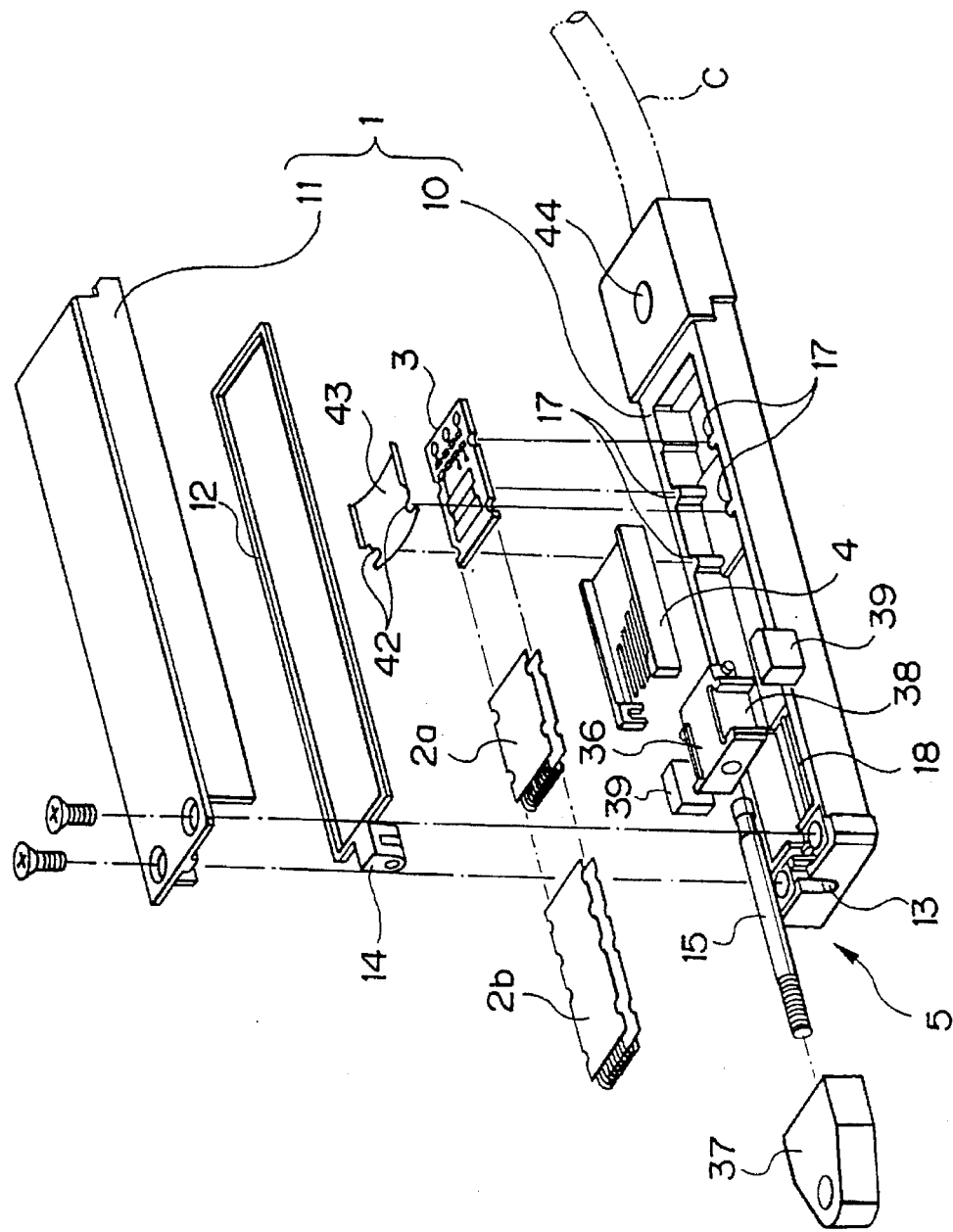
FIG. 1 is an exploded diagram of the maximum value storage sensor according to the first embodiment.

One preferred embodiment of the maximum value storage sensor of the present invention is shown in the exploded diagram in FIG. 1. The first embodiment is based on the first basic form. The maximum value storage sensor according to the first embodiment, as seen in FIG. 1, is comprised of two pieces of conductive body 2a, 2b having substantially the same structure placed in the protective case 1, a printed circuit board 3 connected to these conductive bodies, and a comb type cutter 4 as the cutting means and a slider.

Figure 2:
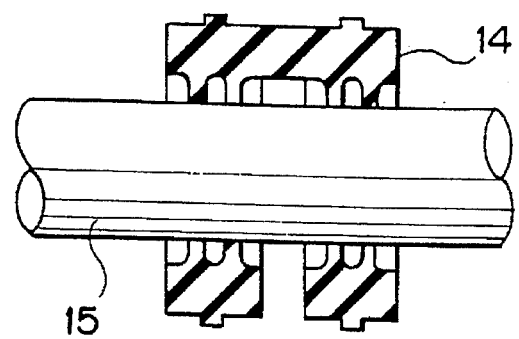
FIG. 2 is a fragmentary sectional view illustrating the relation between the through hole part of the protective case and the rod.
Figure 3:
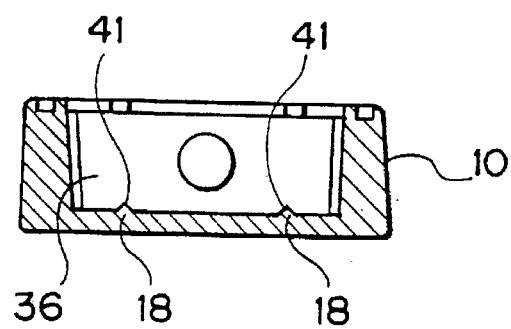
FIG. 3 is a fragmentary sectional view illustrating the relation between the protective case body and the slide block.

The protective case 1 is comprised of an aluminum diecast protective case body 10 formed in a flat rectangular box, an aluminum diecast cover 11 for covering the protective case body 10, and a sealing packing 12 for water-tight sealing interlaid between the case body and the case cover. On one end of the protective case body 10, a through hole part 13 is formed, corresponding to which a ring sealing 14 is attached. As shown in FIG. 2, the ring sealing 14 is formed so as to seal the circumference of a rod part 15 of the slider 5 as described later, in the shape resembling an O-ring. The protective case body 10 has, as an engagement projection, two pairs of semi-circular bosses 17 crosswise on the inner surface , and two lines of a rail 18 having a convex form on the bottom (FIG. 3).

Figure 8:
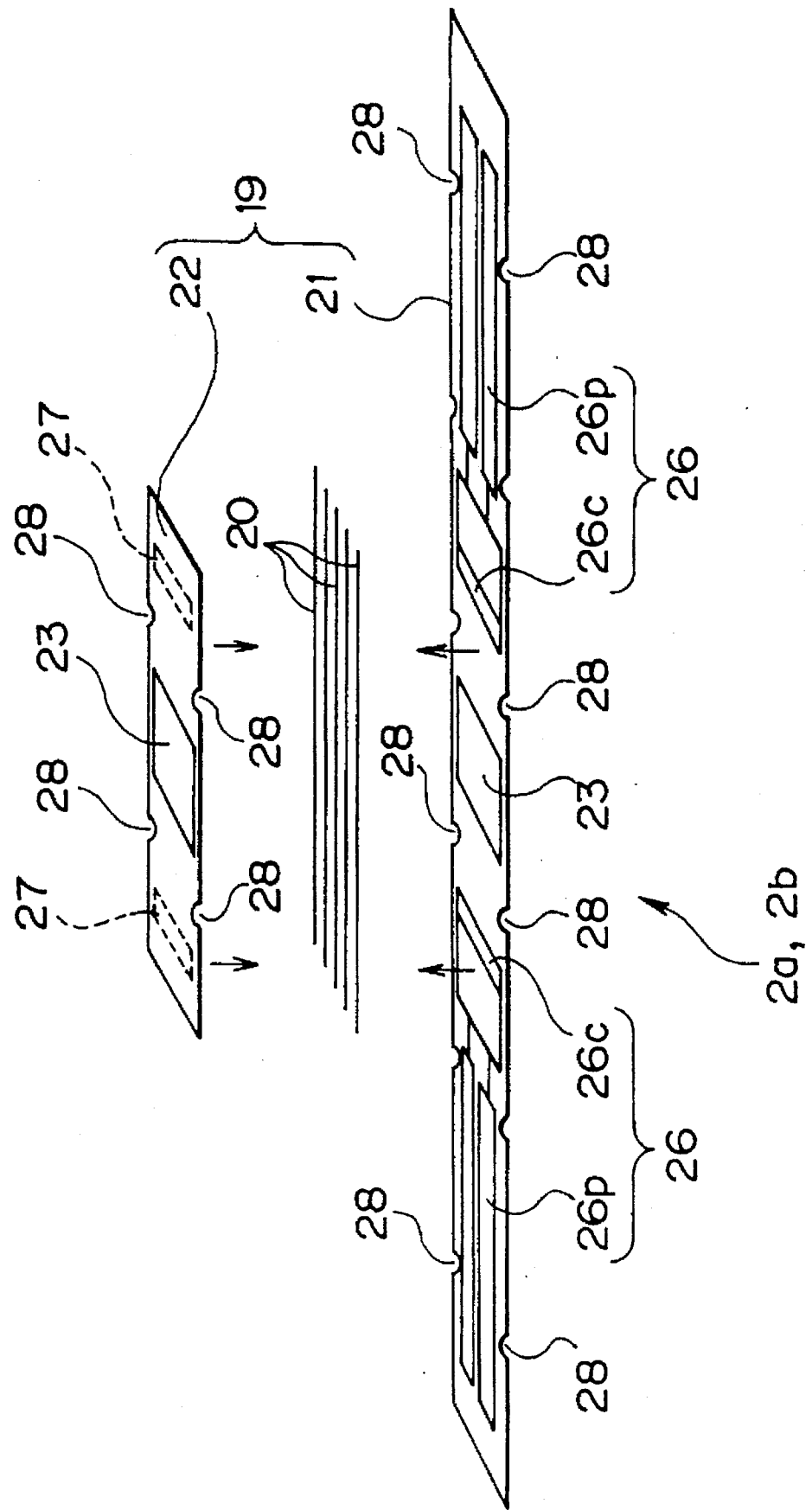
FIG. 8 is an exploded assembly view of the conductive body.

The conductive body 2a, 2b, as the exploded assembly is seen in FIG. 8, is formed by sandwiching a given number of the conductive elements 20, 20, - - - between a pair of retaining sheets 19, where the conductive elements 20, 20, - - - are arrayed in parallel. Each of the conductive elements is made by binding some ten to several hundred carbon filaments so as to give about several ohms/1 mm to a bunch of the carbon filaments. The retaining sheet 19 is formed by laminating a base sheet 21 and a cover sheet 22, both of which are made of a heat resistant polyimide resin. A thermoplastic polyimide resin is used for an adhesive agent for this lamination, more preferably, in a film or sheet form. The lamination is made by simultaneously applying pressure and heat, such as 20–30 kg/cm$^2$ and 230°–250° C., respectively. The conductive elements are arrayed in parallel and sandwiched between this lamination.

Figure 9:
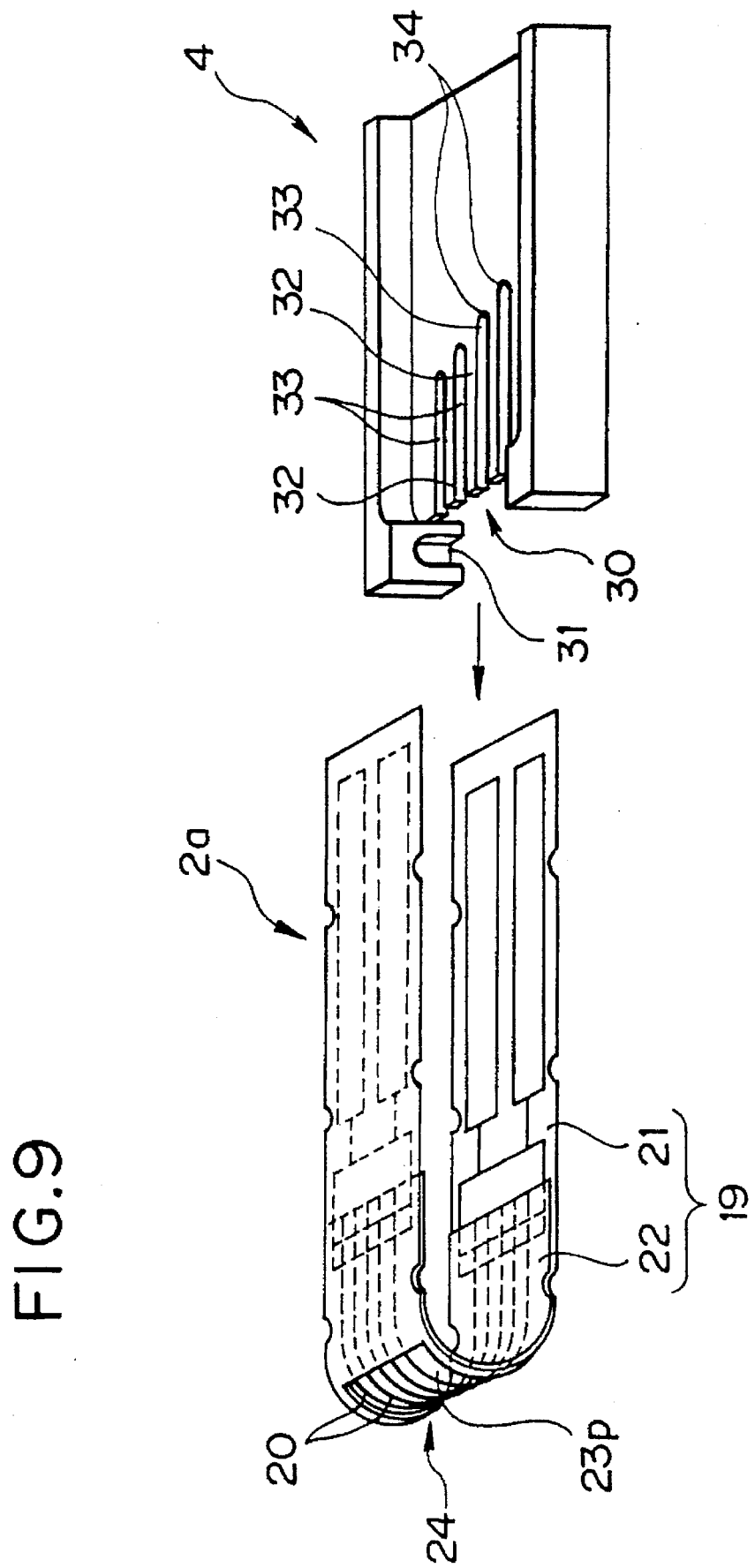
FIG. 9 is a perspective view illustrating the relation between the conductive body folded back and the comb type cutter.

Each of the sheets 21,22 has a same-sized rectangular opening 23, both of which are made to overlap. As shown in FIG. 9, the laminated sheet is folded back so as to substantially overlap the folding center line and the center line of the overlapped opening 23p is formed by this lamination. A folded part 24 is formed having the conductive elements 20, 20, - - - arrayed in parallel and made to enter substantially in the center of the opening part 23p. On the sheet 21 and 22, output electrode terminals are formed by photo-etching or the like in the same manner as the flexible printed circuit board.

As concretely seen in FIG. 8, on the base sheet 21 an electrode terminal 26 is comprised of a contact part 26c crossed transversally, and a conductive wiring 26p extending in the longitudinal direction of the base sheet 21. On the cover sheet 22, an electrode terminal 27 is formed at a position corresponding to the contact part 26c. When the conductive elements 20, 20, - - - are sandwiched between the base sheet 21 and the cover sheet 22, the contact part 26c and the electrode terminal 27 are electrically brought into contact from both sides. On the retaining sheet 19, semi-circular cutouts 28 are formed as an engagement recess on both the right and left sides with equal spacing.

Figure 10:
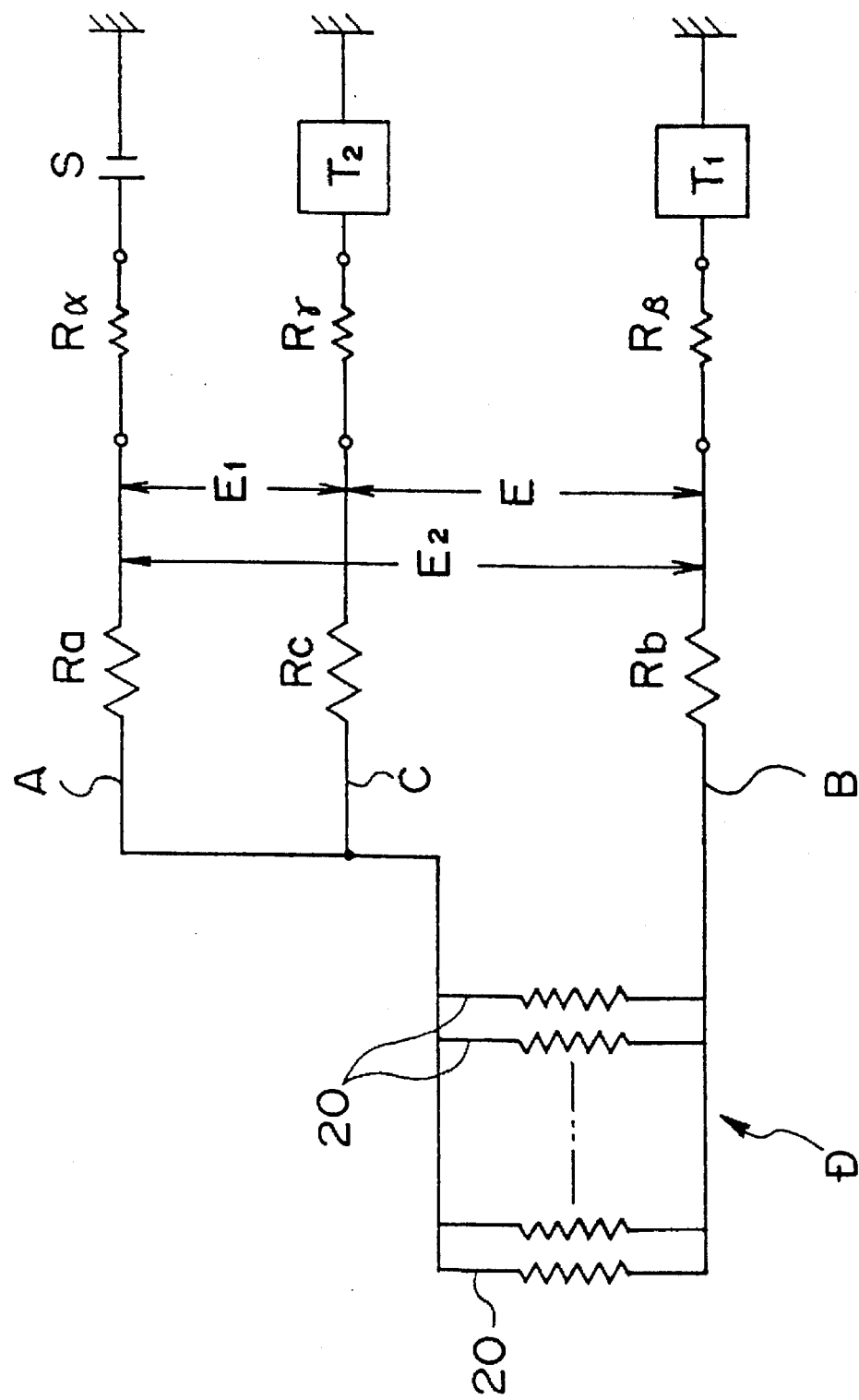
FIG. 10 is an output circuit for the conductive body.

A printed circuit board 3 has an output circuit to feed the output from the conductive body 2a, 2b to the outside through a lead wire C. The output circuit, as shown in FIG. 10, includes a parallel resistance circuit D comprised of the conductive elements 20, 20, - - - of the conductive body. From this parallel resistance circuit, a pair of output voltage paths A, B are led out; the third output voltage path C is branched out from the output voltage path A. To the output voltage path A, a power supply S is connected; and between the power supply S and the branch point of the output voltage path C, an identifying resistance Ra for labeling the sensor information is connected in series which relates to the intrinsic characteristic of the individual maximum value storage sensor, such as the above-mentioned range. In FIG. 10, half of the conductive body is omitted for simplicity.

To the output voltage path B and the output voltage path C, a constant current circuit $T_1$, $T_2$ are connected, respectively. As to the output voltage path B, a compensation resistance Rb is connected between the constant current circuit $T_1$ and the parallel resistance circuit D. As for the output voltage path C , on the other hand, a balance resistance Rc is connected in series between the constant current circuit $T_2$ and the parallel resistance circuit D. The compensation resistance Rb is to compensate for any resistance variation depending on the temperature variation of the conductive elements; and an element is applied which produces an inversely proportional resistance variation against the resistance variation depending on the temperature variation of the conductive elements. On the other hand, the balance resistance Rc is to balance the compensation resistance Rb; and an element is applied which gives the same or substantially the same characteristic. The power supply S can be omitted by giving a power supply function to the constant current circuit $T_1$ or $T_2$.

The output from this output circuit should be acquired as a voltage E between the output voltage path C and the output voltage path B. The voltage E should be acquired by $E=E_2-E_1$, where $E_1$, $E_2$ are obtained by the voltage $E_1$ between the output voltage path C and the output voltage path A, and the voltage $E_2$ between the output voltage path A and B, respectively. This output circuit gives by the voltage $E_1$ sensor information, concretely range information or as information for recognizing each of the maximum value storage sensors, when a plurality of the maximum value storage sensors are used and these outputs are processed collectively.

Figure 11:
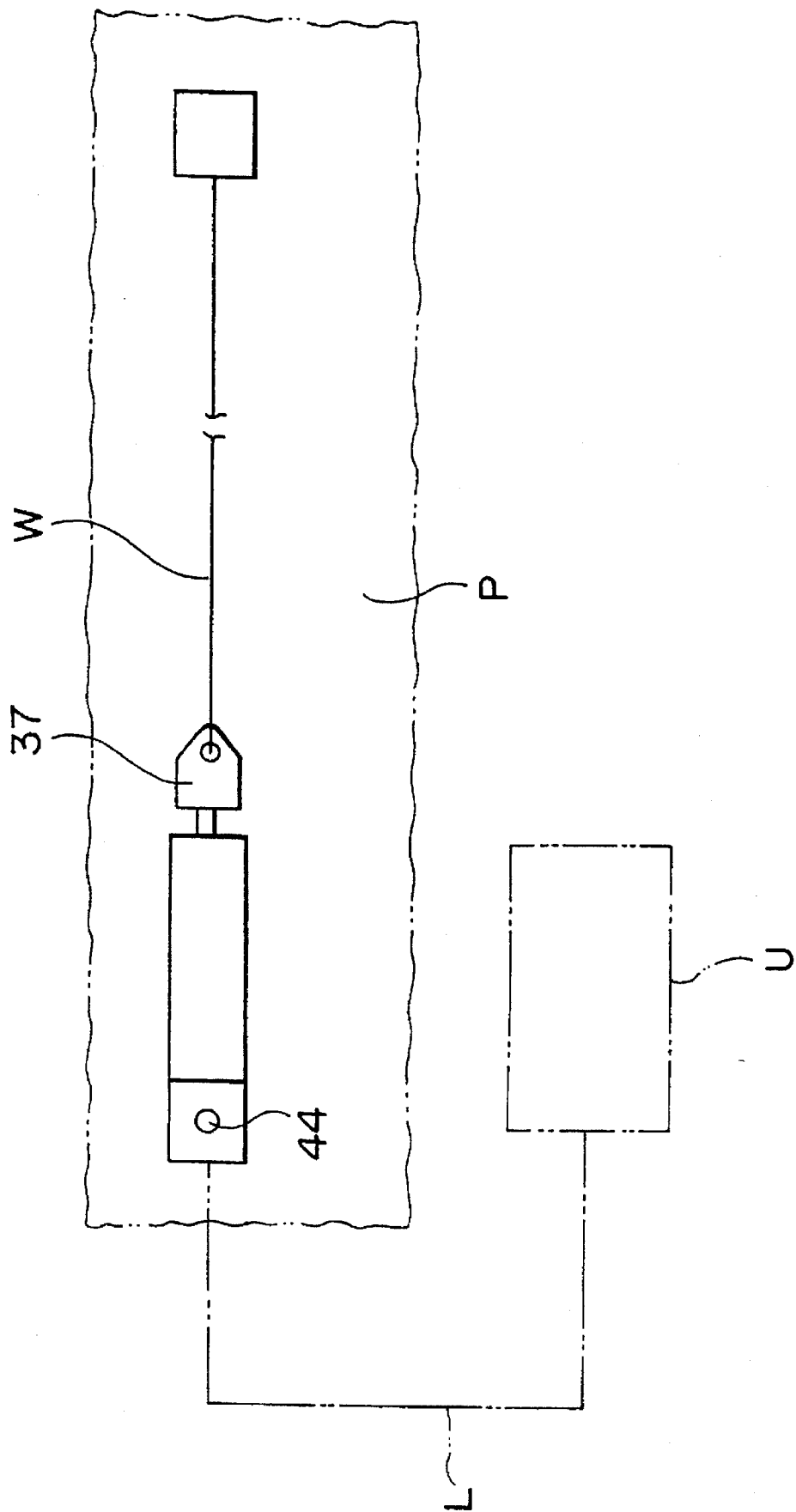
FIG. 11 is an illustration for an application of the maximum value storage sensor.

Here, provided that the current by the constant current circuit $T_1$ and the constant current circuit $T_2$ is given by $I_1$ and $I_2$, respectively, the composite resistance of the parallel resistance circuit is given by Rcom , and the intrinsic resistance of a lead wire L is given by $R\alpha, R\beta, R\gamma$, wherein the wire L connects the maximum value storing sensor to the processing unit U as described later in FIG. 11;

$$E_1 = (I_1 + I_2)(Ra + R\alpha) + I_2(Rc + R\gamma),$$
$$E_2 = (I_1 + I_2)(Ra + R\alpha) + I_1(Rb + Rcom + R\beta); \text{therefore,}$$
$$\begin{aligned} E &= (I_1+I_2)(Ra+R\alpha)+I_1(Rb+Rcom+R\beta) - \\ &\quad [(I_1+I_2)(Ra+R\alpha)+I_2(Rc+R\gamma)] \\ &= I_1Rb + I_1Rcom + I_1R\beta - I_2Rc - I_2R\gamma \end{aligned}$$

will be obtained. Therefore, as described above, Rb=Rc, and since each wire has the same thickness and same length, generally $R\alpha=R\beta=R\gamma$ is given; and therefore, provided that $I_1=I_2=I$ is given, E=IRcom will be achieved. Thus, the influence by the identifying resistance Ra and the compensation resistance Rb can be removed from the output voltage E, and the influence by the circuit resistance depending on the length of the lead wire is removed simultaneously.

Next, the setting method of the resistance value of the conductive elements 20 in the parallel resistance circuit D in the output circuit will be described. Provided that the resistance values of the conductive elements are $R_0, R_1, R_2, R_3, \text{- - -} Rn$, according to the array in FIG. 10 from left to right, and the value of $R_0$ is set to A, then the value $R_1, R_2, R_3, \text{- - -} Rn$ will be achieved by the equations given below. In this case, the cutoff of the conductive elements is made to occur sequentially in the order of $Rn, Rn_{-1}, Rn_{-2}, \text{- - -} R_1$.

$$R_1 = (A^2 - AD)/D \quad (1)$$

$$Rn = R_1 - \sum_{n=2}^{Rn=0} [T - 2D(n-2)] \quad (2)$$

Here, D represents the variation of the composite resistance Rcom of the parallel resistance circuit, occurring whenever one of the conductive elements cuts off, and it is predetermined to a planned value. And T is a constant given by the following equation.

$$T=2(A-D) \tag{3}$$

To show an example to obtain the resistance of each of the conductive elements, if A=120Ω, D=5Ω, then from the equation(1) and (2), R1=2760 W and T=230 W will be obtained. Assuming n=23, then R2, R3, - - - Rn will be obtained from the equation (3), respectively as follows:

|  |  | (I) | (II) |
|---|---|---|---|
| $R_0$ | = | 120 | 120 |
| $R_1$ | = | 2760 | 115 |
| $R_2 = 2760 - 230$ | = | 2530 | 110 |
| $R_3 = 2760 - (230 + 220)$ | = | 2310 | 105 |
| $R4 = 2760 - (230 + 220 + 210)$ | = | 2100 | 100 |
| $R22 =$ 2760 - (230 + 220 + 210 + --- + 30) | = | 240 | 10 |
| $R23 =$ 2760 - (230 + 220 + 210 + --- + 30 + 20) | = | 220 | 5 |

Where, A is the resistance (Ω) of the conductive elements, and B is the value of the composite resistances(Ω).

As seen in these number values, setting the resistance of the conductive elements based on the values obtained by the foregoing equations causes the resistance of the composite resistance Rcom to vary by 5Ωwhenever one of the conductive elements cuts off and gives an excellent linearity to the relation between the cutoff of the conductive elements and the variation of the composite resistance. Thus, giving the linearity will facilitate processing the output from the maximum value storage sensor.

Figure 4:
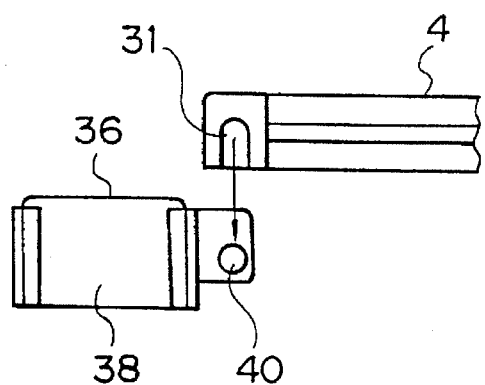
FIG. 4 is a schematic illustration showing the relation between the slide block part and the comb type cutter.
Figure 5:
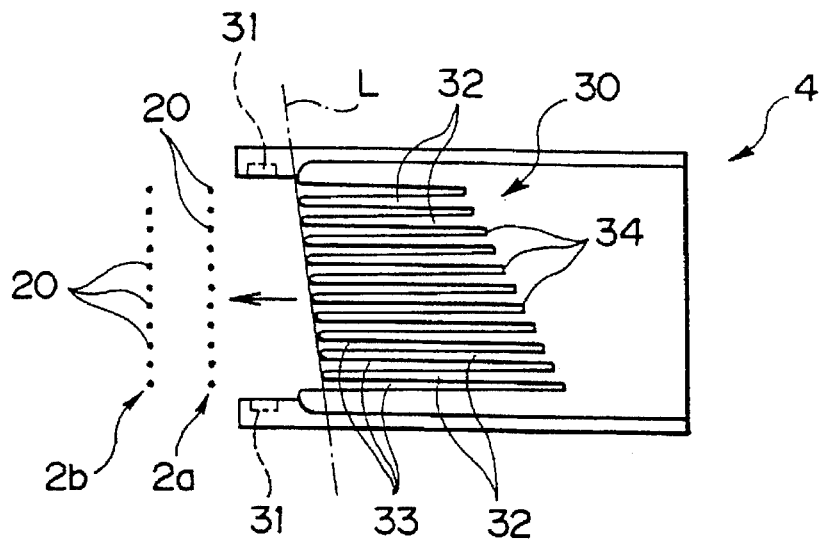
FIG. 5 is a top plan view of the comb type cutter illustrating the relation with the conductive elements simultaneously.
Figure 6:
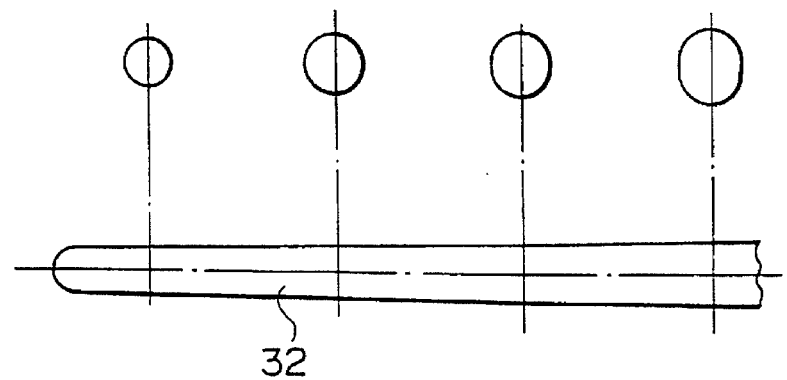
FIG. 6 is a schematic illustration of the comb tooth illustrating the circumferential shapes at different parts simultaneously.

The comb type cutter 4 comprises, as illustrated in FIGS. 5 and 9, a comb part 30 having a width corresponding to a folded part 24 of the conductive elements facing to the opening 23p of the conductive body, and engagement concave 31(FIG. 4) on the shoulder part projected on both sides of the comb part. The comb part 30 comprises comb teeth 32, 32, - - - with a space corresponding to the space of an array of the conductive elements 20, 20, - - - at the folding part 24, and cutters 34 formed at each of the inner ends of gaps of the comb teeth. As shown in FIG. 6, each of the comb teeth 32 is formed to become gradually thinner from the proximal end toward the distal end, and the distal ends of these comb teeth are made to array along a line L slanting cross-wise against the longitudinal direction of the comb teeth (FIG. 5).

The slider 5 comprises a slide block 36, a rod 15 of a slender bar projected from the slider block, and a connector 37 attached at the end of the rod. The slide block 36 is formed in a solid and rectangular body and comprises break attachment parts 38 on which both sides break pads 39 should be installed, projections 40 should be provided adjacent to the break attachment parts 38 (FIG. 4), and on its bottom two lines of slots 41 corresponding to the rails 18 of the protective case body 10 (FIG. 3) should be provided. The rod 15 is made to fittingly connect at its proximal end to the slide block 36, and to screw its distal end into the connector 37 by forming screw threads on its distal end.

Figure 7:
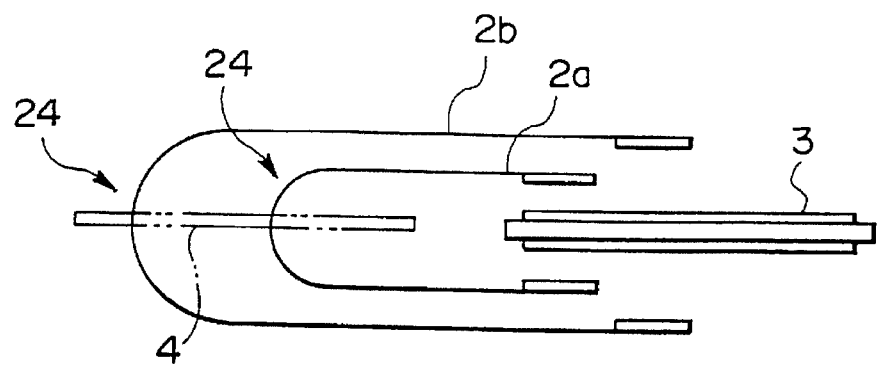
FIG. 7 is a schematic illustration showing the relation between both of the conductive body and the printed circuit board.

The incorporation of these elements into the protective case body 10 will be made as follows. As shown in FIG. 7, the conductive body 2b is made to sandwich and overlap the conductive body 2a with having these two bodies folded back as mentioned above, and the cutouts 28 in each of the retaining sheets are made to fit in with the bosses 17 of the protective case body 10 so as to make a fixed positioning with the protective case body 10. The printed circuit board 3 is made to fit cutouts 28 formed on its side edges into the bosses 17.

The conductive body 2a, 2b and the printed circuit 3 are pressed on the overlapped parts by a spring plate 43 having cutouts 42 to fit in the bosses 17. Thus, the conductive body 2a, 2b and the print circuit board 3 forms the above-mentioned circuit.

The comb type cutter 4, as illustrated in FIG. 7 and FIG. 9 is made to put into the inner conductive body 2a, wherein each of the conductive elements 20, 20, - - - of each of the conductive body 2a, 2b is inserted one by one into the gaps 33 between the comb teeth as seen in FIG. 5.

As for the slider 5, a projection 40 formed on the slide block 36 is made to fit in the engagement concave 31 formed on the comb cutter 4 as shown in FIG. 4, and the slots 41 of the slide block 36, as shown in FIG. 3, are made to fit in on the rails 18 of the protective case body 10, and furthermore, the distal end side of the rod 15 is made to project out of the through hole part 13 of the protective case body 10 to connect to the connector 37.

The maximum value storage sensor as described above will be used as shown in FIG. 11, for instance, when it is used for detecting a strain in component members of structures. The protective case 1 is fixed on a position adjacent to one end of a component member P on the object structure by using a fixing hole 44 formed on the protective case, and an appropriate length of wire W is connected to the connector 37 of the slider, and the other end of this wire W is fixed at a position adjacent to the other end of the component member P. The direction of strain exerted on the wire W is set parallel to the major direction that a strain is predicted to occur in the component member P. Under this condition, if a strain occurs in the component member P, a tension according to the strain will be applied to the wire W, thereby moving the slider 5 and correspondingly, the comb type cutter 4 will sequentially cut off each of the conductive elements 20, 20, - - - of the conductive body 2a, 2b. And, according to this cutoff, the voltage E of the output circuit as described above will gradually increase. The resistance variation is finally processed for a value representing the strain in the component member P, by a processing unit U connected to the sensor through a lead wire L, and this value is fed by using an appropriate output medium.

As understood from above, the maximum value storage sensor has a different maximum detection range according to whether the movement of the comb type cutter 4 for cutting off all of the conductive elements 20, 20, - - - is set, for instance, to 5 mm or 10 mm. It has, in other words, a detectable range. Therefore as described above, to obtain an end output as a strain of the component member P, the processing unit U needs the information of this range which is given by the method mentioned above.

Figure 12:
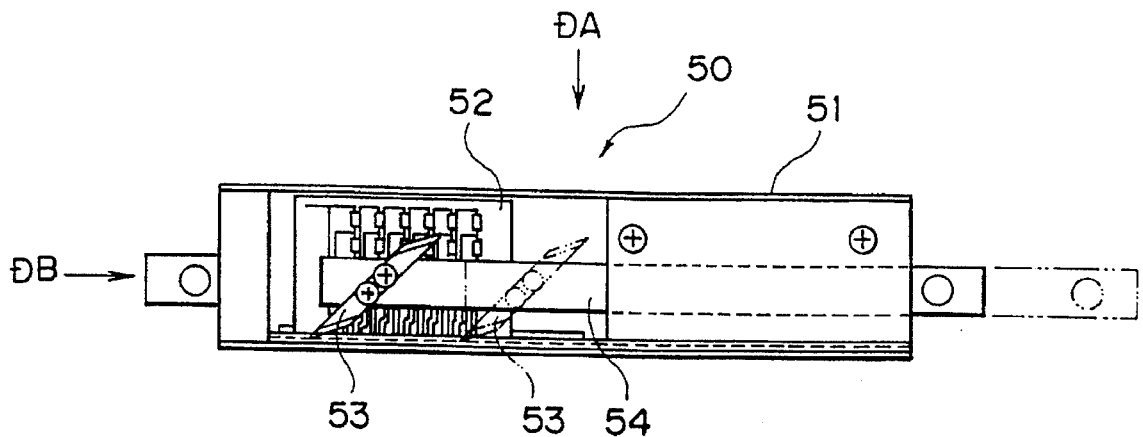
FIG. 12 is a side elevation view illustrating the inner structure of the maximum value storage sensor according to the second embodiment form of this invention.
Figure 13:
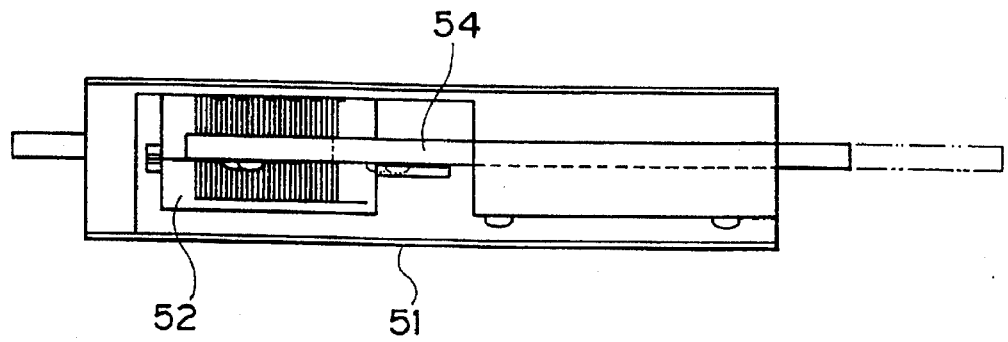
FIG. 13 is a plan view viewed from the direction of the arrow DA in FIG. 12.
Figure 14:
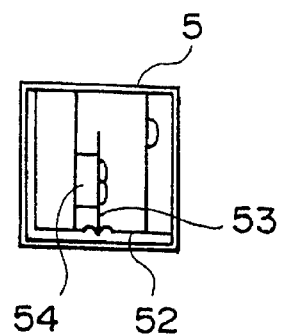
FIG. 14 is a schematic sectional view viewed from the direction of the arrow DB in FIG. 12.

FIG. 12 to FIG. 14 relate to the maximum value storage sensor according to the second embodiment based on the foregoing second basic form. As seen in these figures, the maximum value storage sensor according to this embodiment comprises a longitudinal column-like case 51, wherein a conductive body 52, a cutting means 53, and a slider 54 are incorporated. The maximum value storage sensor according to the second embodiment can be used in the same manner as that according to the first embodiment.

Figure 15:
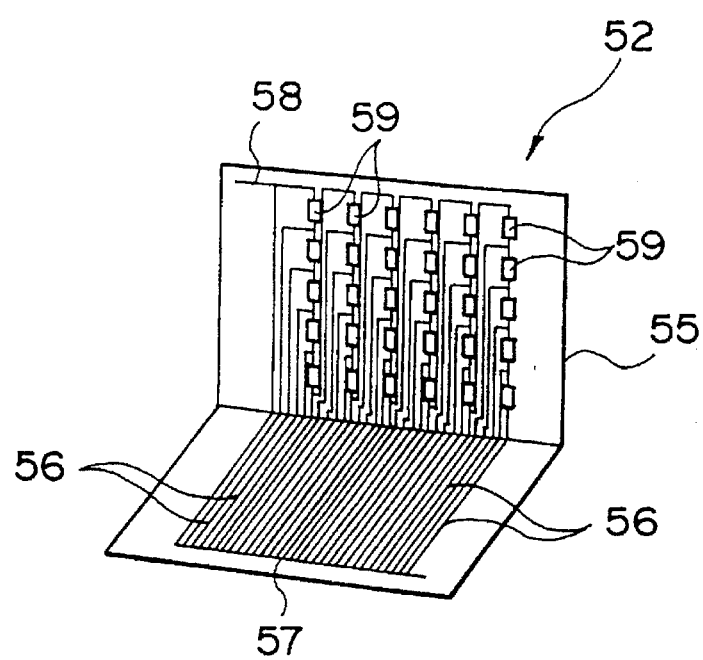
FIG. 15 is a perspective view of the conductive body of the maximum value storage sensor.
Figure 16:
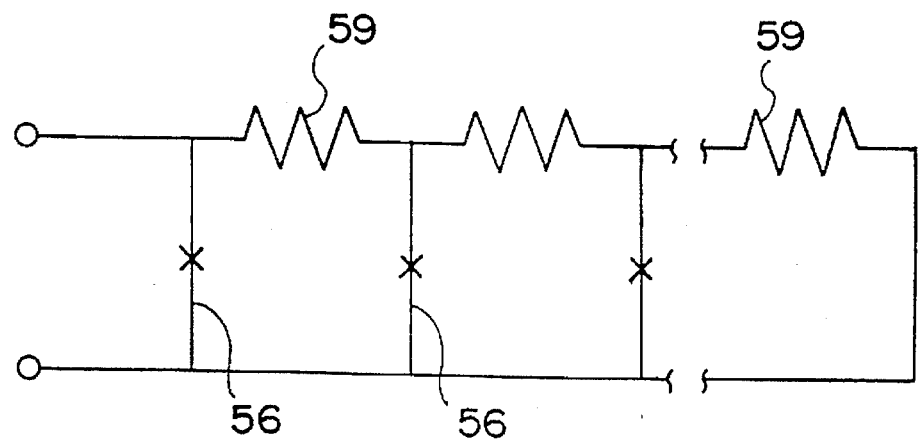
FIG. 16 is an equivalent circuit relative to the conductive body in FIG. 15.
Figure 17:
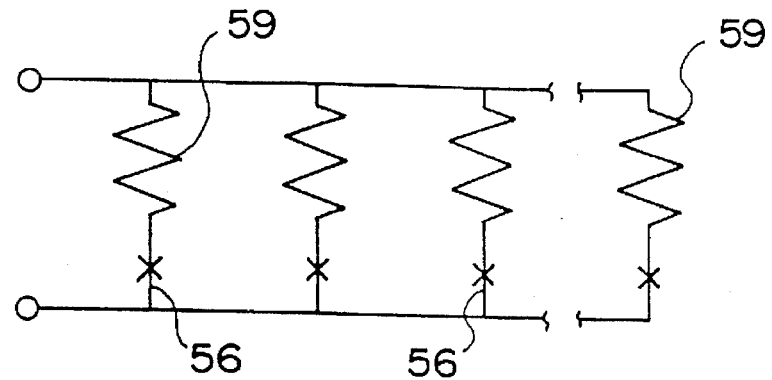
FIG. 17 is an equivalent circuit relative to the other conductive body.
Figure 18:
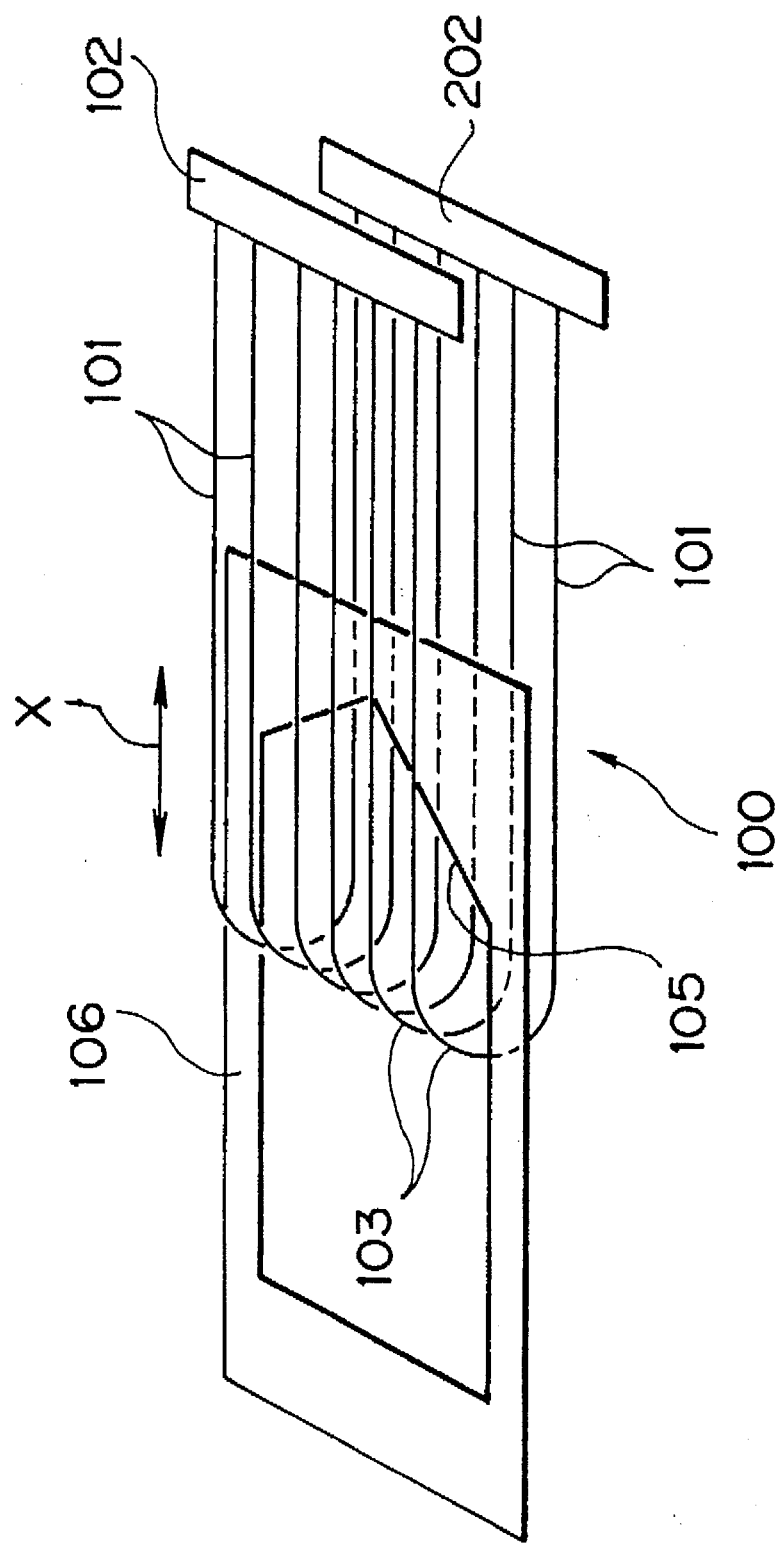
FIG. 18 is an illustration for describing the principle of the first basic form relative to the maximum value storage sensor of this invention.
Figure 19:
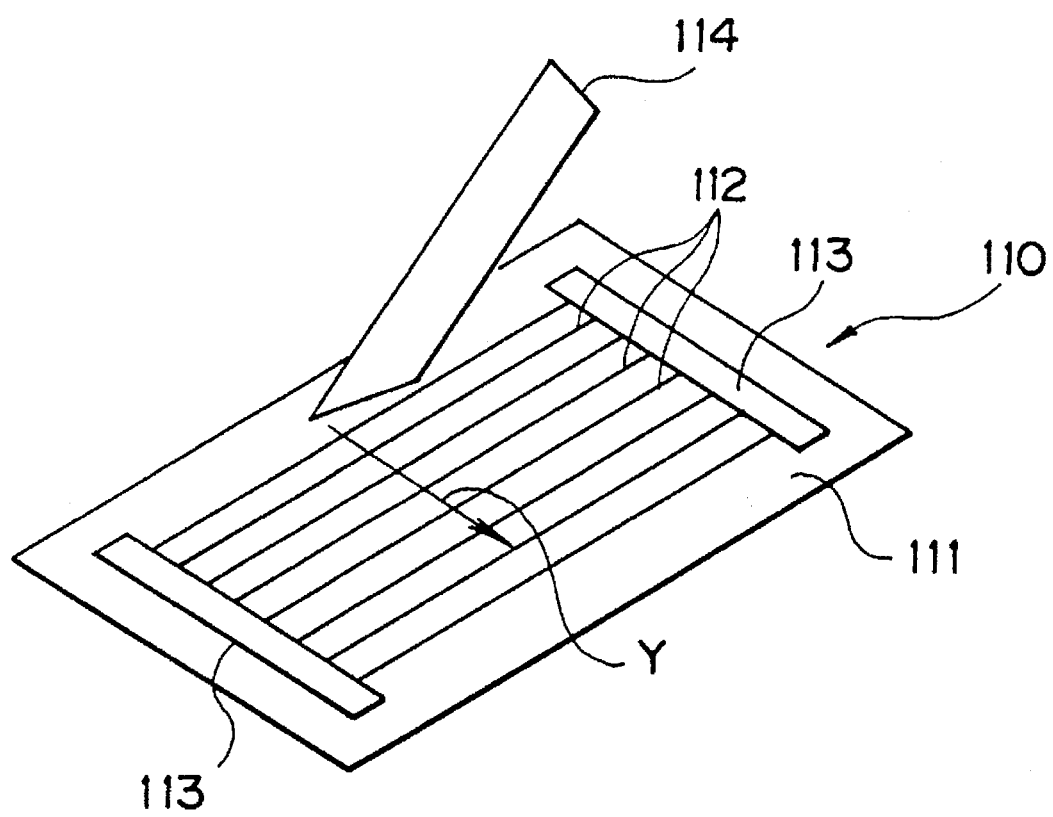
FIG. 19 is an illustration for describing the principle of the second basic form relative to the maximum value storage sensor of this invention.

The conductive body 52 is formed, as shown in FIG. 15, by applying the system of the flexible printed board. More concretely, the conductive body 52 is comprised of a plastic film substrate 55 on which copper patterns 56 for the conductive elements are arrayed in parallel with a given space, copper patterns 57, 58 for terminals are connected to each of the copper patterns 56, each being formed by the printing, and chip resistors 59 are connected to each of the copper patterns 56. The equivalent circuit for the conductive body 52 will be as shown in FIG. 16, and that as shown in FIG. 17 can also be formed.

The cutting means 53 is formed in a knifeform, and is held by a screw on the rear end of the slider 54 formed in a slender barform. The slider 54 holding the cutting means 53 is made to slide by being guided by a slider guide (not illustrated in the drawings), and is designed to move right in FIG. 12, according to the movement of which the cutting means 53 is designed to cut the copper patterns 56, 56, - - - with the film substrate 55.

We claim:

1. A maximum value storage sensor for detecting maximum strains in a component member of structures, comprising:
    a conductive body having;
        a plurality of filamentary conductive elements arrayed in parallel with each having a given electrical resistance, and with each folded part of the conductive elements at the middle part arranged transversally in one line, and
        a circuit which gives a correlative resistance change corresponding to the sequential cutoff of the conductive elements;
    a cutting means for cutting off the conductive elements located on the the folded part of the conductive body;
    a slider for moving the cutting means relative to the conductive body; and
    a protective case for housing the conductive body, the cutting means, and the slider with watertightness,
wherein the protective case is attached to an object component member in a structure so as to induce a relative movement against the conductive body in the slider corresponding to a strain exerted on the component member, the cutting means sequentially cuts off the conductive elements inside the conductive body corresponding to an amount of the relative movement, and the resistance of the conductive body in the cutoff state gives a maximum strain in the component member of the structure.

2. A maximum value storage sensor as claimed in claim 1, wherein the slider comprises a slider block, a rod of a slender bar projecting out of the slider block, and a connecting part provided at the end of the rod; and at one end of the protective case, a through hole part communicating with the outside is formed, through which the distal end of the rod projects out of the protective case.

3. A maximum value storage sensor as claimed in claim 1, wherein rails are formed in the protective case, and the slider movement trajectory is restricted by the rails.

4. A maximum value storage sensor as claimed in claim 1, wherein the cutting means is comprised of a comb part having a plurality of comb teeth and cutters formed at each of inner ends of the gaps between the comb teeth, and cuts the conductive elements by the cutters with having each of the conductive elements on the conductive body inserted into each of the gaps between each comb tooth; and each of the comb teeth is tapering toward the distal end.

5. A maximum value storage sensor as claimed in claim 1, wherein each end of the comb teeth is arranged along a slantly crossed line against the longitudinal direction of the comb teeth.

6. A maximum value storage sensor as claimed in claim 1, wherein the conductive body is formed such that a given number of the conductive elements are sandwiched between a pair of sheet materials each having an opening part, being laminated so as to overlap both of the openings, with each folded end of the conductive elements arrayed transversally in one line in the opening part.

7. A maximum value storage sensor as claimed in claim 6, wherein the positioning of the conductive body in the protective case is conducted in incorporating the conductive body into the protective case, by a recess formed in the retaining sheet and a projection formed in the protective case, and by hooking the recess in the retaining sheet on the projection in the protective case.

8. A maximum value storage sensor as claimed in claim 1, wherein the conductive body is formed such that a given number of the conductive elements are sandwiched between a pair of sheet materials formed of non-thermoplastic resin to be laminated by an adhesive agent of thermoplastic resin, and electrode terminals from the conductive elements for output are formed on the junction surface by bringing the conductive elements into contact with the electrode terminals of each of the sheet materials.

9. A maximum value storage sensor as claimed in claim 8, wherein the positioning of the conductive body in the protective case is conducted in incorporating the conductive body into the protective case, by a recess formed in the retaining sheet and a projection formed in the protective case, and by hooking the recess in the retaining sheet on the projection in the protective case.

10. A maximum value storage sensor for detecting a maximum strain in a component member of structures, comprising:
    a conductive body formed by a sheet-like circuit board having conductive elements arrayed in parallel with a predetermined space; and
    a cutting means for cutting off the conductive elements sequentially from the side edge of the parallel array of the conductive elements corresponding to the relative movement against the conductive body,
wherein the cutting means is attached to an object component member in a structure so as to induce a relative movement against the conductive body in the cutting means corresponding to a strain exerted on the component member, the cutting means sequentially cuts off the conductive elements of the conductive body corresponding to an amount of the relative movement, and the resistance of the conductive body in the cutoff state gives a maximum strain in the component member of the structure.

11. A maximum value storage sensor as claimed in claim 1, wherein the output circuit feeds the sensor data concerning the characteristics of the sensor in detection, based on an identifying resistance connected to an output voltage path A of a pair of output voltage paths A and B in the parallel resistance circuit formed by the conductive elements on the conductive body.

12. A maximum value storage sensor as claimed in claim 10, wherein the output circuit feeds the sensor data concerning the characteristics of the sensor in detection, based on an identifying resistance connected to the output voltage path A of a pair of output voltage paths A and B in the parallel resistance circuit formed by the conductive elements on the conductive body.

13. A maximum value storage sensor as claimed in claim 11, wherein a third output voltage path C is branched from the output voltage path A connected to the identifying resistance; constant current is applied to the output voltage paths A, B, and C; the sensor data is fed in the form of the voltage $E_1$ between the output voltage path C and the output voltage path A in this state; and the cutoff state of the conductive elements is fed in the form of the voltage E, obtaining the voltage E between the output voltage path C and the output voltage path B by $E=E_2-E_1$ derived from the voltage $E_1$ and voltage $E_2$ between the output voltage paths A and B.

14. A maximum value storage sensor as claimed in claim 12, wherein a third output voltage path C is branched from the output voltage path A connected to the identifying resistance; constant current is applied to the output voltage paths A, B, and C; the sensor data is fed in the form of the voltage $E_1$ between the output voltage path C and the output voltage path A in this state; and the cutoff state of the conductive elements is fed in the form of the voltage E, obtaining the voltage E between the output voltage path C and the output voltage path B by $E=E_2-E_1$ derived from the voltage $E_1$ and voltage $E_2$ between the output voltage paths A and B.

* * * * *